(12) United States Patent
Wagner et al.

(10) Patent No.: US 10,618,252 B2
(45) Date of Patent: Apr. 14, 2020

(54) SOLAR CONTROL COATING FOR LAMINATED GLAZING

(71) Applicant: Vitro Flat Glass LLC, Cheswick, PA (US)

(72) Inventors: Andrew V. Wagner, Pittsburgh, PA (US); Michael J. Buchanan, Cranberry Township, PA (US)

(73) Assignee: Vitro Flat Glass LLC, Cheswick, PA (US)

( * ) Notice: Subject to any disclaimer, the term of this patent is extended or adjusted under 35 U.S.C. 154(b) by 71 days.

(21) Appl. No.: 15/951,079

(22) Filed: Apr. 11, 2018

(65) Prior Publication Data

US 2018/0297322 A1 Oct. 18, 2018

Related U.S. Application Data

(60) Provisional application No. 62/484,508, filed on Apr. 12, 2017.

(51) Int. Cl.
  *B32B 17/06* (2006.01)
  *B32B 7/02* (2019.01)
  (Continued)

(52) U.S. Cl.
  CPC ............... *B32B 7/02* (2013.01); *B32B 15/04* (2013.01); *B32B 17/10036* (2013.01); *B32B 17/10229* (2013.01); *B32B 17/10761* (2013.01); *B32B 18/00* (2013.01); *B32B 33/00* (2013.01); *C03C 17/36* (2013.01); *C03C 17/366* (2013.01); *C03C 17/3639* (2013.01); *C03C 17/3644* (2013.01); *C04B 37/005* (2013.01); *C04B 37/008* (2013.01); *G02B 5/282* (2013.01); *G02B 5/285* (2013.01); *G02F 1/0063* (2013.01); *G02F 1/0102* (2013.01); *B32B 2250/05* (2013.01); *B32B 2250/42* (2013.01); *B32B 2307/204* (2013.01); *B32B 2307/412* (2013.01);
  (Continued)

(58) Field of Classification Search
  CPC .. B32B 17/06; B32B 17/10036; B32B 17/366
  USPC .................................. 359/585, 360; 428/216
  See application file for complete search history.

(56) References Cited

U.S. PATENT DOCUMENTS

| 8,025,957 B2 * | 9/2011 | Thiel ................ B32B 17/10036 359/360 |
| 2003/0180547 A1 | 9/2003 | Buhay et al. |

(Continued)

*Primary Examiner* — Audrey Y Chang
(74) *Attorney, Agent, or Firm* — The Webb Law Firm

(57) ABSTRACT

A laminated glazing having a first ply connected to a second ply by a polymeric interlayer; and a solar control coating located on at least one of the major surfaces thereof, the solar control coating including: a first phase adjustment layer; a first metallic layer located over the first phase adjustment layer; a first primer layer located over the first metallic layer; a second phase adjustment layer located over the first primer layer; a second metallic layer located over the second phase adjustment layer; a second primer layer located over the second metallic layer; a third phase adjustment layer located over the second primer layer; a third metallic layer located over the third phase adjustment layer; a third primer layer located over the third metallic layer; a fourth phase adjustment layer located over the third primer layer; and a protective layer located over the fourth phase adjustment layer.

19 Claims, 3 Drawing Sheets

(51) Int. Cl.
  *B32B 18/00*    (2006.01)
  *B32B 33/00*    (2006.01)
  *G02B 5/28*     (2006.01)
  *G02F 1/00*     (2006.01)
  *G02F 1/01*     (2006.01)
  *B32B 15/04*    (2006.01)
  *C03C 17/36*    (2006.01)
  *B32B 17/10*    (2006.01)
  *C04B 37/00*    (2006.01)
  *B82Y 30/00*    (2011.01)

(52) U.S. Cl.
  CPC ... *B32B 2307/416* (2013.01); *B32B 2307/418* (2013.01); *B32B 2309/105* (2013.01); *B32B 2311/02* (2013.01); *B32B 2313/02* (2013.01); *B32B 2315/02* (2013.01); *B32B 2551/00* (2013.01); *B82Y 30/00* (2013.01); *C04B 2237/06* (2013.01); *C04B 2237/062* (2013.01); *C04B 2237/064* (2013.01); *C04B 2237/068* (2013.01); *C04B 2237/704* (2013.01); *G02F 2202/10* (2013.01); *G02F 2203/01* (2013.01); *G02F 2203/02* (2013.01)

(56) References Cited

U.S. PATENT DOCUMENTS

| | | |
|---|---|---|
| 2004/0247929 A1 | 12/2004 | Buhay et al. |
| 2007/0020465 A1 | 1/2007 | Thiel et al. |
| 2008/0280147 A1 | 11/2008 | Thiel |
| 2016/0223729 A1 | 8/2016 | Medwick et al. |
| 2017/0059753 A1 | 3/2017 | Wagner et al. |

* cited by examiner

SOLAR CONTROL COATING FOR LAMINATED GLAZING

BACKGROUND OF THE INVENTION

1. Field of the Invention

This invention relates to a solar control coating for a laminated glazing and to a laminated glazing incorporating the solar control coating.

2. Technical Considerations

Solar control coatings block or filter selected ranges of electromagnetic radiation. Typically, the blocked radiation is in the infrared region and/or ultraviolet region of the electromagnetic spectrum. Solar control coatings are used on glazings, such as architectural or vehicle windows, to reduce the amount of selected ranges of solar energy entering a building or vehicle. This reduces the heat buildup inside the building or vehicle.

Many architectural glazings are in the form of insulating glass units (IGUs). These insulating glass units have two or more glass panes fitted into a spacer and separated by an air gap. Each of the gaps is filled with a gas, such as argon. Many vehicular glazings are laminated glazings. Laminated glazings have two or more glass panes connected together by a polymeric material. There are some situations where it would be preferable to use a laminated glazing rather than an IGU for a building. For example, laminated glazings can be made more impact resistant than conventional IGUs. In addition, there are also some situations where it may be desirable to employ a laminated glazing as part of an IGU.

Therefore, it would be desirable to provide a solar control coating that provides enhanced solar control and/or aesthetic performance when used in a laminated architectural glazing. For example, it would be desirable to provide a solar control coating for a laminated architectural glazing having a low solar heat gain coefficient (SHGC) to prevent heat buildup inside of a building. For example, it would be desirable to provide a solar control coating for a laminated architectural glazing having a high visible light transmittance. This improves the natural lighting inside the building. For example, it would be desirable to provide a solar control coating for a laminated glazing such that the glazing could be used for either architectural or vehicular glazings.

In addition, it has been realized that current commercial methods of applying a solar control coating to an IGU or a laminated glazing introduce some inherent variation in the thickness of each layer of the solar control coating due to manufacturing tolerances, and this inherent variation may affect the color, transmittance, or other optical properties of a product. The effect of this inherent variation on the optical properties of a product varies with the design of the coating, and too much variation in layer thicknesses may render a manufacturing process not commercially viable.

It has been further realized that the presence of the polymer interlayer in a laminated glazing may amplify the effect of this inherent variation on the optical properties of the final glazing product. Further, uniformity of the final product is generally more important in architectural applications than in vehicular applications because multiple panels of the same product are often arranged alongside one another. As such, certain coating compositions which may be acceptable in an IGU or in a vehicular laminated glazing may not be acceptable in a laminated glazing used in an architectural application. Accordingly, it would be desirable to provide a solar control coating composition which minimizes the effect of manufacturing variation on the variation in optical properties of the finished product, such that an acceptable level of variation in optical properties may be achieved even in a laminated glazing for use in an architectural application.

SUMMARY OF THE INVENTION

In order to address some or all of the above-referenced deficiencies in the art, the present disclosure provides a laminated glazing. The laminated glazing comprises a first ply connected to a second ply by a polymeric interlayer. The first ply has a first major surface and a second major surface, and the second ply has a third major surface and a fourth major surface. A solar control coating is located on at least one of the major surfaces. The solar control coating comprises a first phase adjustment layer; a first metallic layer located over the first phase adjustment layer; a first primer layer located over the first metallic layer; a second phase adjustment layer located over the first primer layer; a second metallic layer located over the second phase adjustment layer; a second primer layer located over the second metallic layer; a third phase adjustment layer located over the second primer layer; a third metallic layer located over the third phase adjustment layer; a third primer layer located over the third metallic layer; a fourth phase adjustment layer located over the third primer layer; and a protective layer located over the fourth phase adjustment layer. The first phase adjustment layer has an optical thickness in the range of 44 nm to 90 nm, preferably an optical thickness in the range of 51 nm to 81 nm, more preferably an optical thickness in the range of 53 nm to 74 nm. The second phase adjustment layer has an optical thickness in the range of 97 nm to 176 nm, preferably an optical thickness in the range of 99 nm to 156 nm, more preferably an optical thickness in the range of 118 nm to 136 nm. The third phase adjustment layer has an optical thickness in the range of 112 nm to 169 nm, preferably an optical thickness in the range of 126 nm to 160 nm, more preferably an optical thickness in the range of 147 nm to 156 nm; and/or wherein the fourth phase adjustment layer has an optical thickness in the range of 47 nm to 82 nm, preferably an optical thickness in the range of 58 nm to 75 nm, more preferably an optical thickness in the range of 60 nm to 73 nm.

BRIEF DESCRIPTION OF THE DRAWINGS

The invention will be described with reference to the following drawing figures wherein like reference numbers identify like parts throughout.

DESCRIPTION OF THE PREFERRED EMBODIMENTS

Figure 1:
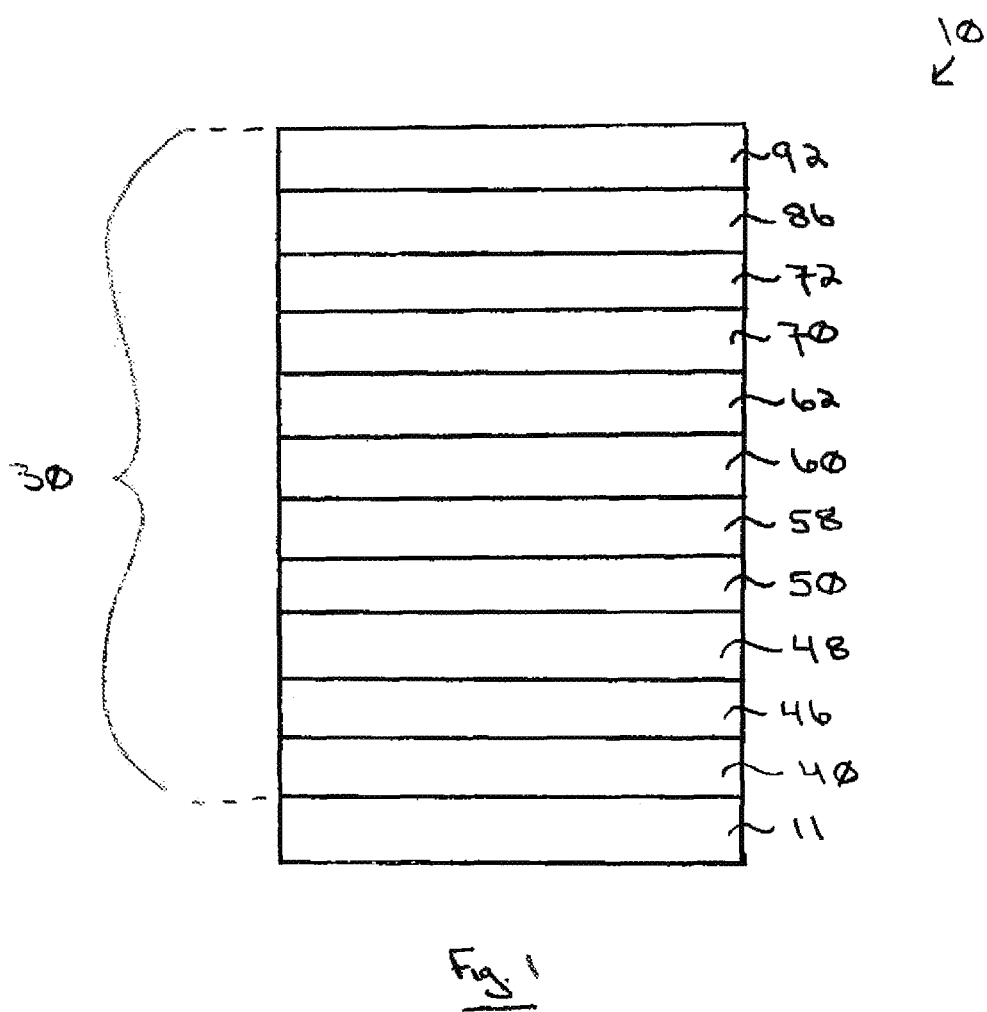
FIG. 1 is a side view (not to scale) of a coated article having a solar control coating of the invention.

Spatial or directional terms, such as "left", "right", "inner", "outer", "above", "below", and the like, relate to the invention as it is shown in the drawing figures. However, the invention can assume various alternative orientations and, accordingly, such terms are not to be considered as limiting.

All numbers used in the specification and claims are to be understood as being modified in all instances by the term "about". By "about" is meant a range of plus or minus ten percent of the stated value.

All ranges disclosed herein encompass the beginning and ending range values and any and all subranges subsumed therein. The ranges disclosed herein represent the average values over the specified range.

With respect to coating layers or films described herein, the term "over" means farther from the substrate (or base layer) on which the coating layer or film under discussion is located. For example, a second layer located "over" a first layer means that the second layer is located farther from the substrate (or base layer) than is the first layer. The second layer can be in direct contact with the first layer. Alternatively, one or more other layers can be located between the first layer and the second layer.

The term "film" means a region having a chemically distinct and/or homogeneous composition. A "layer" comprises one or more "films". A "coating" comprises one or more "layers".

The terms "polymer" or "polymeric" include oligomers, homopolymers, copolymers, and terpolymers, e.g., polymers formed from two or more types of monomers or polymers.

The term "ultraviolet radiation" means electromagnetic radiation having a wavelength in the range of 100 nm to less than 380 nm. The terms "visible radiation" or "visible light" mean electromagnetic radiation having a wavelength in the range of 380 nm to 780 nm. The term "infrared radiation" means electromagnetic radiation having a wavelength in the range of greater than 780 nm to 100,000 nm. The term "solar infrared radiation" means electromagnetic radiation having a wavelength in the range of 1,000 nm to 3,000 nm. The term "thermal infrared radiation" means electromagnetic radiation having a wavelength in the range of greater than 3,000 nm to 100,000 nm.

All documents referred to herein are "incorporated by reference" in their entirety.

The term "optical thickness" means the geometric thickness of the material multiplied by the refractive index of the material at a reference wavelength of 550 nm. For example, a material having a geometric thickness of 5 nm and a refractive index of 2 at a reference wavelength of 550 nm would have an optical thickness of 10 nm.

The terms "tempered" or "heat-treated" mean that the article or coating under discussion has been heated to a temperature sufficient to achieve thermal tempering, heat bending, and/or heat strengthening. This definition includes, for example, heating the article in an oven or furnace at a temperature of at least 580° C., such as at least 600° C., such as at least 620° C., for a period of time to achieve thermal tempering, heat bending, and/or heat strengthening. For example, the heating can be for a period of time in the range of 1 to 15 minutes, such as 1 to 5 minutes.

The term "non-heat-treated" means not tempered or heat-treated, or not designed to be tempered or heat-treated for final use.

The terms "metal" and "metal oxide" include silicon and silica, respectively, as well as traditionally recognized metals and metal oxides, even though silicon conventionally may not be considered a metal.

By "at least" is meant "greater than or equal to". By "not greater than" is meant "less than or equal to".

Any reference to amounts, unless otherwise specified, is "by weight percent" (wt %).

Thickness values, unless indicated to the contrary, are geometric thickness values.

A "dopant" is a material present in an amount less than 10 wt %, such as less than 5 wt %, such as less than 4 wt %, such as less than 2 wt %. For example, less than 1 wt %. For example, less than 0.5 wt %. For example, less than 0.1 wt %.

The term "includes" is synonymous with "comprises".

The term "curable" means a material capable of polymerizing or crosslinking. By "cured" is meant that the material is at least partly polymerized or cross-linked, preferably fully polymerized or cross-linked.

A "reference laminated unit" is defined as having two plies of 2 mm clear glass connected by a 0.76 mm interlayer of polyvinyl butyral and with the coating on the No. 2 surface. A reference laminated unit value means the reported value when the coating is incorporated into a reference laminated unit on the No. 2 surface.

The term "solar control coating" refers to a coating comprised of one or more layers or films that affect the solar properties of the coated article, such as the amount of solar radiation reflected from, absorbed by, or transmitted through the coating.

Optical and solar control performance values (e.g., visible light transmittance and/or haze), unless indicated to the contrary, are those determined using a Perkin Elmer 1050 Spectrophotometer. Reference laminated unit values, unless indicated to the contrary, are determined in accordance with OPTICS (v6.0) software and WINDOWS (v7.3.4.0) software available from Lawrence Berkeley National Laboratory, measured center of glazing (COG), calculated according to NFRC 2010 (which includes NFRC 100-2010) standard default settings.

Sheet resistance values, unless indicated to the contrary, are those determined using a four-point probe (e.g., Nagy Instruments SD-600 measurement device or Alessi four-point probe). Surface roughness values are those determined using an Instrument Dimension 3100 Atomic Force Microscope.

Color values (e.g., $L^*$, $a^*$, $b^*$, $C^*$, and hue°) are in accordance with the 1976 CIELAB color system specified by the International Commission on Illumination.

The $L^*$, $a^*$, and $b^*$ values in the specification and claims represent color center point values.

The discussion of the invention may describe certain features as being "particularly" or "preferably" within certain limitations (e.g., "preferably", "more preferably", or "even more preferably", within certain limitations). It is to be understood that the invention is not limited to these particular or preferred limitations but encompasses the entire scope of the disclosure.

The invention comprises, consists of, or consists essentially of the following aspects of the invention, in any combination. Various aspects of the invention are illustrated in separate drawing figures. However, it is to be understood that this is simply for ease of illustration and discussion. In the practice of the invention, one or more aspects of the invention shown in one drawing figure can be combined with one or more aspects of the invention shown in one or more of the other drawing figures.

The invention will be discussed with reference to an architectural glazing. By "architectural glazing" is meant any glazing located on or in a building. Examples of architectural glazings include windows, sky lights, and divider panels. However, it is to be understood that the invention is not limited to use with architectural glazings but could be practiced with glazings in any desired field.

Examples include laminated or non-laminated residential and/or commercial windows, and/or glazings for land, air, space, above water and/or underwater vehicles. Therefore, it is to be understood that the specifically disclosed examples are presented simply to explain the general concepts of the invention, and that the invention is not limited to these specific examples. Additionally, while a typical "glazing" can have sufficient visible light transmission such that materials can be viewed through the glazing, in the practice of the invention, the "glazing" need not be transparent to visible light but may be translucent or opaque.

Figure 2:
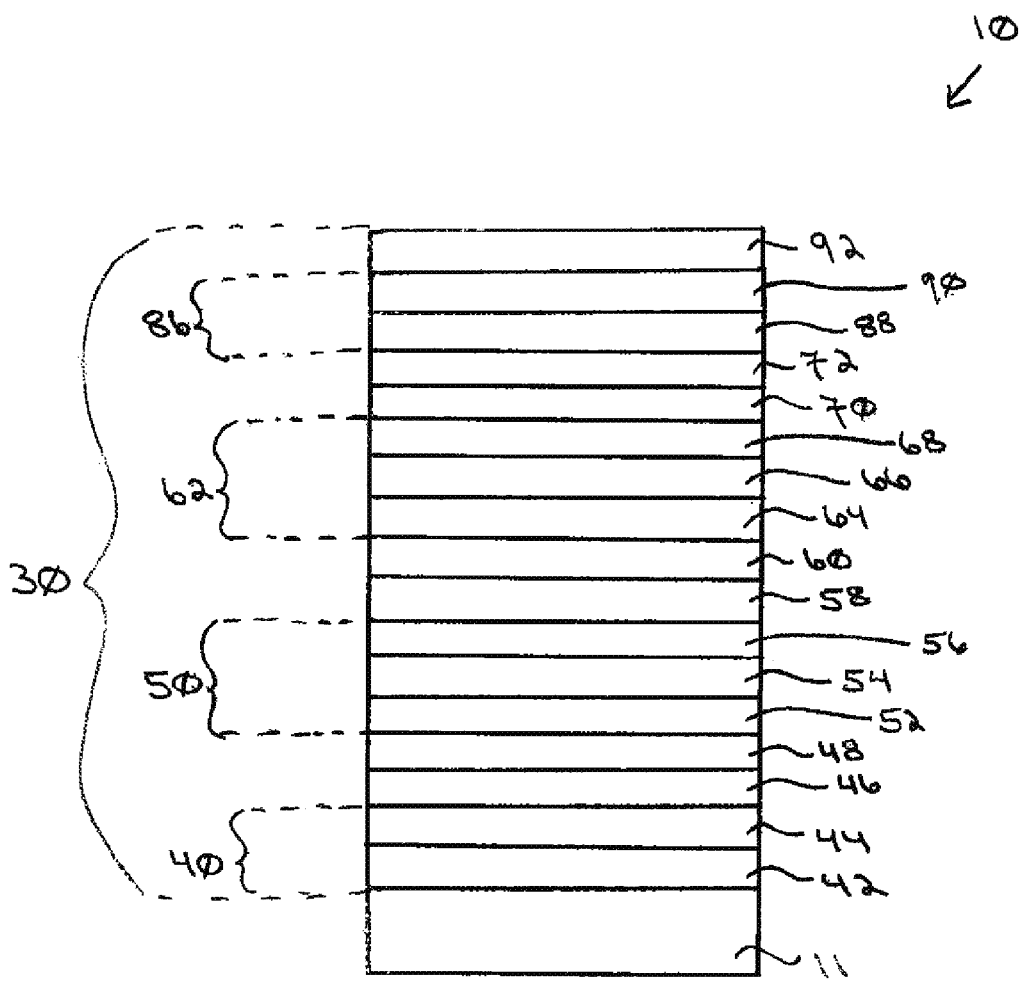
FIG. 2 is a side view (not to scale) of the coated article of FIG. 1 illustrating a multilayer structure of an exemplary solar control coating of the invention.

A coated article 10 incorporating features of the invention is illustrated in FIGS. 1 and 2. The coated article 10 includes a substrate 11 having at least one major surface. A solar control coating 30 of the invention is located over at least a portion of one of the major surfaces.

As shown in FIG. 1, the solar control coating 30 comprises a first phase adjustment layer 40. A first metallic layer 46 is located over the first phase adjustment layer 40. A first primer layer 48 is located over the first metallic layer 46. A second phase adjustment layer 50 is located over the first primer layer 48. A second metallic layer 58 is located over the second phase adjustment layer 50. A second primer layer 60 is located over the second metallic layer 58. A third phase adjustment layer 62 is located over the second primer layer 60. A third metallic layer 70 is located over the third phase adjustment layer 62. A third primer layer 72 is located over the third metallic layer 70. A fourth phase adjustment layer 86 is located over the third primer layer 72. A protective layer 92 is located over the fourth phase adjustment layer 86.

The substrate 11 can be transparent or translucent to visible radiation. By "transparent" is meant having visible radiation transmittance of greater than 0% up to 100%. Alternatively, the substrate 11 can be translucent. By "translucent" is meant diffusing visible radiation such that objects on the side opposite a viewer are not clearly visible. Alternatively, the substrate 11 can be opaque. By "opaque" is meant having a visible light transmittance of 0%. The substrate 11 may be clear or may be colored or tinted.

Examples of suitable materials for the substrate 11 include plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, the substrate 11 can comprise conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be non-heat-treated or heat-treated glass. The glass can be of any type, such as conventional float glass, and can be of any composition having any optical properties, e.g., any value of visible radiation transmittance, ultraviolet radiation transmittance, infrared radiation transmittance, and/or total solar energy transmittance. By "float glass" is meant glass formed by a conventional float process in which molten glass is deposited onto a molten metal bath and controllably cooled to form a float glass ribbon.

The substrate 11 can be clear float glass or can be tinted or colored glass. The substrate 11 can be of any desired dimensions, e.g., length, width, shape, or thickness. Examples of glass that can be used for the practice of the invention include clear glass, Starphire®, Solargreen®, Solextra®, GL-20®, GL-35™, Solarbronze®, Solargray® glass, Pacifica® glass, SolarBlue® glass, and Optiblue® glass, all commercially available from Vitro Architectural Glass of Cheswick, Pa.

The phase adjustment layers 40, 50, 62, 86 comprise nonmetallic materials. For example, the phase adjustment layers 40, 50, 62, 86 can comprise dielectric or semiconductor materials. For example, the phase adjustment layers 40, 50, 62, 86 can comprise oxides, nitrides, oxynitrides, borides, carbides, oxycarbides, borocarbides, boronitrides, carbonitrides, and/or mixtures, combinations, blends, or alloys thereof. Examples of suitable materials for the phase adjustment layers 40, 50, 62, 86 include oxides, nitrides, or oxynitrides of titanium, hafnium, zirconium, niobium, zinc, bismuth, lead, indium, tin, silicon, aluminum, boron, and mixtures, combinations, blends, or alloys thereof. These can have small amounts of other materials. Examples include manganese in bismuth oxide, tin in indium oxide, etc. Additionally, oxides of metal alloys or metal mixtures can be used. Examples include oxides containing zinc and tin (e.g., zinc stannate), oxides of indium-tin alloys, silicon nitrides, silicon aluminum nitrides, or aluminum nitrides. Further, doped metal oxides, suboxides, nitrides, subnitrides, or oxynitrides can be used. Examples include antimony or indium doped tin oxides or nickel or boron doped silicon oxides. Particular examples of materials include zinc oxides, tin oxides, silicon nitrides, silicon-aluminum nitrides, silicon-nickel nitrides, silicon-chromium nitrides, antimony doped tin oxide, tin doped zinc oxide, aluminum doped zinc oxide, indium doped zinc oxide, titanium oxide, and/or mixtures, combinations, blends, or alloys thereof.

One or more of the phase adjustment layers 40, 50, 62, 86 can comprise a single material and/or a single film. Alternatively, one or more of the phase adjustment layers 40, 50, 62, 86 can comprise multiple materials and/or multiple films. The phase adjustment layers 40, 50, 62, 86 can comprise a stratified sequence of films of chemically distinct materials or phases and/or may comprise one or more composites of one or more chemically distinct materials or phases. The different phase adjustment layers 40, 50, 62, 86 can comprise the same materials or different materials. The phase adjustment layers 40, 50, 62, 86 can have the same thickness or different thicknesses.

The phase adjustment layers 40, 50, 62, 86 allow adjustment of the constructive and destructive optical interference of electromagnetic radiation partially reflected from, and/or partially transmitted by, the various interface boundaries of the layers of the solar control coating 30. Varying the thicknesses and/or compositions of the phase adjustment layers 40, 50, 62, 86 can change the overall reflectance, transmittance, and/or absorptance of the solar control coating 30, which can alter the solar control performance, thermal infrared insulating performance, color, and/or aesthetics of the solar control coating 30. Additionally, the phase adjustment layers 40, 50, 62, 86 can provide chemical and/or mechanical protection for one or more of the other layers of the solar control coating 30, such as one or more of the metallic layers 46, 58, 70.

Where high visible light transmittance is desired, the phase adjustment layers 40, 50, 62, 86 can act as antireflective layers to anti-reflect the metallic layers 46, 58, 70 to reduce the overall visible light reflectance and/or increase the visible light transmittance of the solar control coating 30. Materials having refractive indices around 2 are particularly useful for antireflection of many metallic layers.

One or more phase adjustment layers can be located between the substrate 11 and the lowermost metallic layer 46. One or more phase adjustment layers can be located between the uppermost metallic layer 70 and the ambient environment, e.g., air.

In the illustrated exemplary coating 30, the first phase adjustment layer 40 is located over at least a portion of a major surface of the substrate 11. For example, the first phase adjustment layer 40 can be in direct contact with the substrate 11. The first phase adjustment layer 40 can be a single layer or can comprise one or more films of antireflective materials and/or dielectric materials described above. The first phase adjustment layer 40 can be transparent to visible light. The first phase adjustment layer 40 may or may not exhibit minimal absorption in one or more regions of the electromagnetic spectrum, for example, visible light.

The first phase adjustment layer 40 can comprise any of the phase adjustment materials described above. For example, the first phase adjustment layer 40 can comprise a metal oxide, a doped metal oxide, a mixture of metal oxides, or a metal alloy oxide. For example, the first phase adjustment layer 40 can comprise doped or non-doped oxides of zinc and tin.

The first phase adjustment layer 40 can have an optical thickness in the range of 44 nm to 90 nm. For example, an optical thickness in the range of 51 nm to 81 nm. For example, an optical thickness in the range of 53 nm to 74 nm.

The first phase adjustment layer 40 can have a geometric thickness in the range of 22 nm to 45 nm. For example, a geometric thickness in the range of 25 nm to 41 nm. For example, a geometric thickness in the range of 26 nm to 37 nm.

As shown in FIG. 2, the first phase adjustment layer 40 can comprise a multi-film structure having a first film 42 and a second film 44. The second film 44 can be located over the first film 42.

The first film 42 can comprise, for example, an oxide of a metal alloy or a mixture of metal oxides. For example, the first film 42 can be an oxide of an alloy of zinc and tin. By "an alloy of zinc and tin" is meant both true alloys and also mixtures. The oxide of an alloy of zinc and tin can be that obtained from magnetron sputtering vacuum deposition (MSVD) from a cathode of zinc and tin. The cathode can comprise zinc and tin in proportions of 5 wt % to 95 wt % zinc and 95 wt % to 5 wt % tin, such as 10 wt % to 90 wt % zinc, and 90 wt % to 10 wt % tin. However, other ratios of zinc to tin could also be used. An exemplary oxide of a metal alloy for the first film 42 can be written as $Zn_xSn_{1-x}O_{2-x}$ (Formula 1) where "x" varies in the range of greater than 0 to less than 1. For instance, "x" can be greater than 0 and can be any fraction or decimal greater than 0 and less than 1. The stoichiometric form of Formula 1 is "$Zn_2SnO_4$", commonly referred to as zinc stannate. A zinc stannate layer can be sputter deposited from a cathode having 52 wt % zinc and 48 wt % tin in the presence of oxygen. For example, the first film 42 can comprise zinc stannate.

A doped zinc oxide can be deposited from a zinc cathode that includes another material to improve the sputtering characteristics of the cathode. For example, the zinc cathode can include a small amount of tin (e.g., up to 20 wt %, up to 15 wt %, up to 10 wt %, such as up to 5 wt %) to improve sputtering. In which case, the resultant zinc oxide film would include a small percentage of tin oxide, e.g., up to 20 wt %, up to 15 wt %, up to 10 wt % tin oxide, e.g., up to 5 wt % tin oxide (excluding oxygen). Examples of the other materials include aluminum, indium, and combinations thereof. Preferably, the other material comprises tin.

The second film 44 can comprise a metal oxide, a doped metal oxide, or an oxide mixture. The second film 44 can comprise a metal oxide or a doped metal oxide. For example, the second film 44 can comprise zinc oxide or doped zinc oxide. For example, the second film 44 can comprise tin doped zinc oxide.

The first film 42 can have an optical thickness in the range of 30 nm to 60 nm. For example, an optical thickness in the range of 36 nm to 54 nm. For example, an optical thickness in the range of 37 nm to 50 nm.

The first film 42 can have a geometric thickness in the range of 15 nm to 30 nm. For example, a geometric thickness in the range of 18 nm to 27 nm. For example, a geometric thickness in the range of 18 nm to 25 nm.

The second film 44 can have an optical thickness in the range of 14 nm to 30 nm. For example, an optical thickness in the range of 14 nm to 28 nm. For example, an optical thickness in the range of 16 nm to 25 nm.

The second film 44 can have a geometric thickness in the range of 7 nm to 15 nm. For example, a geometric thickness in the range of 7 nm to 14 nm. For example, a geometric thickness in the range of 8 nm to 13 nm.

The metallic layers 46, 58, 70 can be single films. For example, the metallic layers 46, 58, 70 can comprise a continuous metal film. By "continuous" metal film is meant an unbroken or non-disconnected film, such as a homogeneous film. Or, one or more of the metallic layers 46, 58, 70 can be a multi-film layer. The metallic layers 46, 58, 70 preferably comprise at least one infrared reflective film.

Examples of infrared reflective films include continuous metal films. Examples of infrared reflective metals useful for the infrared reflective films include noble or near noble metals. Examples of such metals include silver, gold, platinum, palladium, osmium, iridium, rhodium, ruthenium, copper, mercury, rhenium, aluminum, and combinations, mixtures, blends, or alloys thereof. For example, one or more of the metallic films can comprise a continuous metallic silver film.

The first metallic layer 46 can comprise a single infrared reflective film comprising any of the above infrared reflective metals. For example, the first metallic layer 46 can comprise a continuous film of metallic silver.

The first metallic layer 46 can have a geometric thickness in the range of 8 nm to 15 nm. For example, a geometric thickness in the range of 8 nm to 13 nm. For example, a geometric thickness in the range of 9 nm to 11 nm.

The primer layers 48, 60, 72 are located in direct contact with the associated underlying metallic layers. The primer layers 48, 60, 72 protect the associated metallic layers during the coating process and/or subsequent processing, such as thermal tempering. The primer material is deposited as a metal. During subsequent processing, such as the deposition of the overlying phase adjustment layer and/or thermal tempering, some or all of the metal primer oxidizes. When oxide or nitride materials are used in the phase adjustment layers, the primer layers 48, 60, 72 can comprise oxophillic or nitrophillic materials, respectively. The primer layers 48, 60, 72 need not be all the same material. The primer layers 48, 60, 72 need not be of the same thickness.

The primer layers 48, 60, 72 can comprise a material that, when fully oxidized, has a refractive index in the range of 2 to 3.

Examples of materials useful for the primer layers 48, 60, 72 include titanium, niobium, tungsten, nickel, chromium, iron, tantalum, zirconium, aluminum, silicon, indium, tin, zinc, molybdenum, hafnium, bismuth, vanadium, manganese, and combinations, mixtures, blends, or alloys thereof.

The first primer layer 48 is located over the first metallic layer 46. The first primer layer 48 can be a single film or a multiple film layer. The first primer layer 48 can comprise any of the primer materials described above. For example, the first primer layer 48 can comprise titanium. For example, the first primer layer 48 can be deposited as titanium metal. The deposited titanium oxidizes to titania upon further processing, for example, heating or the addition of further coating layers.

The first primer layer 48, when fully oxidized, can have an optical thickness in the range of 6 nm to 14 nm. For example, in the range of 7 nm to 12 nm. For example, in the range of 8 nm to 10 nm.

The first primer layer 48 can have a geometric thickness in the range of 2.5 nm to 5.5 nm. For example, in the range of 3 nm to 4.5 nm. For example, in the range of 3.5 nm to 4 nm.

The second phase adjustment layer 50 is located over the first primer layer 48. The second phase adjustment layer 50 can comprise one or more of the phase adjustment materials and/or films described above for the phase adjustment layers.

The second phase adjustment layer 50 can have an optical thickness in the range of 97 nm to 176 nm. For example, an optical thickness in the range of 99 nm to 156 nm. For example, an optical thickness in the range of 118 nm to 136 nm.

The second phase adjustment layer 50 can have a geometric thickness in the range of 33 nm to 88 nm. For example, a geometric thickness in the range of 33.5 nm to 78 nm. For example, a geometric thickness in the range of 59 nm to 68 nm.

The second phase adjustment layer 50 can be a single film or a multi-film structure. For example, the second phase adjustment layer 50 can include a first film 52, a second film 54, and a third film 56.

The first film 52 and the third film 56 can comprise the same or different materials and/or can be of the same or different thickness. The first film 52 and/or the third film 56 can comprise a metal oxide or a doped metal oxide. For example, the first film 52 and/or the third film 56 can comprise zinc oxide or doped zinc oxide. For example, the first film 52 and/or the third film 56 can comprise tin doped zinc oxide. For example, the first film 52 and/or the third film 56 can comprise ZnO 90/10.

The second film 54 can comprise an oxide of a metal alloy. For example, an oxide comprising zinc and tin. For example, the second film 54 can comprise zinc stannate.

The first film 52 (and/or the third film 56) can have an optical thickness in the range of 17 nm to 33 nm. For example, an optical thickness in the range of 17 nm to 30 nm. For example, an optical thickness in the range of 20 nm to 25 nm.

The first film 52 (and/or third film 56) can have a geometric thickness in the range of 7 nm to 13 nm. For example, a geometric thickness in the range of 7 nm to 12 nm. For example, a geometric thickness in the range of 8 nm to 10 nm.

The second film 54 can have an optical thickness in the range of 70 nm to 130 nm. For example, the second film 54 can have an optical thickness in the range of 80 nm to 112 nm. For example, the second film 54 can have an optical thickness in the range of 84 nm to 98 nm.

The second film 54 can have a geometric thickness in the range of 35 nm to 65 nm. For example, the second film 54 can have a geometric thickness in the range of 40 nm to 56 nm. For example, the second film 54 can have a geometric thickness in the range of 42 nm to 49 nm.

The second metallic layer 58 is located over the second phase adjustment layer 50. The second metallic layer 58 can be a single film comprising an infrared reflective film. Alternatively, the second metallic layer 58 can comprise a multi-film layer.

The second metallic layer 58 comprises any of the infrared reflective materials described above. For example, the second metallic layer 58 can be a continuous metal film. For example, the second metallic layer 58 can be a continuous silver film.

The second metallic layer 58 can have a geometric thickness in the range of 8.5 nm to 15 nm. For example, the second metallic layer 58 can have a geometric thickness in the range of 10 nm to 13.5 nm. For example, the second metallic layer 58 can have a geometric thickness in the range of 10 nm to 13 nm.

The second primer layer 60 is located over the second metallic layer 58. The second primer layer 60 can include any of the primer materials and can be any of the thicknesses described above with respect to the optional first primer layer 48. For example, the second primer layer 60 can comprise titanium.

The second primer layer 60 can have an optical thickness in the range of 6 nm to 13 nm. For example, the second primer layer 60 can have an optical thickness the range of 7 nm to 12 nm. For example, the second primer layer 60 can have an optical thickness in the range of 8 nm to 10 nm.

The second primer layer 60 can have a geometric thickness in the range of 2.5 nm to 5 nm. For example, the second primer layer 60 can have a geometric thickness in the range of 3 nm to 4.5 nm. For example, the second primer layer 60 can have a geometric thickness in the range of 3.5 nm to 4 nm.

The third phase adjustment layer 62 is located over the second primer layer 60. The third phase adjustment layer 62 can include any of the phase adjustment materials and/or films as discussed above with respect to the first and second phase adjustment layers 40, 50. For example, the third phase adjustment layer 62 can be a multi-film structure. For example, the third phase adjustment layer 62 can include a first film 64, a second film 66, and a third film 68.

The third phase adjustment layer 62 can have an optical thickness in the range of 112 nm to 169 nm. For example, the third phase adjustment layer 62 can have an optical thickness in the range of 126 nm to 160 nm. For example, the third phase adjustment layer 62 can have an optical thickness in the range of 147 nm to 156 nm.

The third phase adjustment layer 62 can have a geometric thickness in the range of 56 nm to 85 nm. For example, the third phase adjustment layer 62 can have a geometric thickness in the range of 63 nm to 80 nm. For example, the third phase adjustment layer 62 can have a geometric thickness in the range of 73.5 nm to 78 nm.

The first film 64 and/or third film 68 can comprise a metal oxide or a doped metal oxide. For example, the first film 64 and/or the third film 68 can comprise zinc oxide, doped zinc oxide, tin doped zinc oxide. The second film 66 can comprise an oxide of a metal alloy, for example, an oxide comprising zinc and tin or zinc stannate.

The first film 64 and/or the third film 68 can have an optical thickness in the range of 17 nm to 40 nm. For example, the first film 64 and/or the third film 68 can have an optical thickness in the range of 20 nm to 35 nm. For example, the first film 64 and/or the third film 68 can have an optical thickness in the range of 25 nm to 35 nm. The first film 64 and the third film 68 can be of the same or different thickness.

The first film 64 and/or the third film 68 can have a geometric thickness in the range of 7 nm to 16 nm. For example, the first film 64 and/or the third film 68 can have a geometric thickness in the range of 8 nm to 14 nm. For example, the first film 64 and/or the third film 68 can have a geometric thickness in the range of 10 nm to 14 nm.

The second film 66 can have an optical thickness in the range of 80 nm to 120 nm. For example, the second film 66 can have an optical thickness in the range of 88 nm to 110 nm. For example, the second film 66 can have an optical thickness in the range of 104 nm to 108 nm.

The second film 66 can have a geometric thickness in the range of 40 nm to 60 nm. For example, the second film 66 can have a geometric thickness in the range of 44 nm to 55 nm. For example, the second film 66 can have a geometric thickness in the range of 52 nm to 54 nm.

The third metallic layer 70 can be a single film or a multi-film structure. The third metallic layer 70 can be a continuous metal film. For example, the third metallic layer 70 can be a continuous metallic film. For example, the third metallic layer 70 can be a metallic silver film.

The third metallic layer 70 can have a geometric thickness in the range of 8.5 nm to 16 nm. For example, the third metallic layer 70 can have a geometric thickness in the range of 10 nm to 15 nm. For example, the third metallic layer 70 can have a geometric thickness in the range of 12 nm to 14 nm.

The third primer layer 72 can include any of the primer materials described above. For example, the third primer layer 72 can comprise titanium. The titanium can be oxidized to titania upon further processing, as described above.

The third primer layer 72 can have an optical thickness in the range of 2.5 nm to 10 nm. For example, the third primer layer 72 can have an optical thickness in the range of 3.5 nm to 8 nm. For example, the third primer layer 72 can have an optical thickness in the range of 5 nm to 6.5 nm.

The third primer layer 72 can have a geometric thickness in the range of 1 nm to 4 nm. For example, the third primer layer 72 can have a geometric thickness in the range of 1.5 nm to 3 nm. For example, the third primer layer 72 can have a geometric thickness in the range of 2 nm to 2.5 nm.

The fourth phase adjustment layer 86 can comprise one or more of the phase adjustment materials and/or films discussed above with respect to the first, second, or third phase adjustment layers 40, 50, 62.

The fourth phase adjustment layer 86 can have an optical thickness in the range of 47 nm to 82 nm. For example, the fourth phase adjustment layer 86 can have an optical thickness in the range of 58 nm to 75 nm. For example, the fourth phase adjustment layer 86 can have an optical thickness in the range of 60 nm to 73 nm.

The fourth phase adjustment layer 86 can have a geometric thickness in the range of 23 nm to 41 nm. For example, the fourth phase adjustment layer 86 can have a geometric thickness in the range of 29 nm to 38 nm. For example, the fourth phase adjustment layer 86 can have a geometric thickness in the range of 30 nm to 37 nm.

The fourth phase adjustment layer 86 can comprise a first film 88 and a second film 90.

The first film 88 can comprise a metal oxide or a doped metal oxide. For example, zinc oxide or doped zinc oxide. For example, the first film 88 can comprise tin doped zinc oxide. For example, ZnO 90/10. The second film 90 can comprise an oxide of a metal alloy, for example, an oxide comprising zinc and tin or zinc stannate.

The first film 88 can have an optical thickness in the range of 17 nm to 30 nm. For example, the first film 88 can have an optical thickness in the range of 20 nm to 27 nm. For example, the first film 88 can have an optical thickness in the range of 20 nm to 26 nm.

The first film 88 can have a geometric thickness in the range of 8 nm to 15 nm. For example, the first film 88 can have a geometric thickness in the range of 10 nm to 14 nm. For example, the first film 88 can have a geometric thickness in the range of 10 nm to 13 nm.

The second film 90 can have an optical thickness in the range of 30 nm to 52 nm. For example, the second film 90 can have an optical thickness in the range of 36 nm to 50 nm. For example, the second film 90 can have an optical thickness in the range of 38 nm to 48 nm.

The second film 90 can have a geometric thickness in the range of 15 nm to 26 nm. For example, the second film 90 can have a geometric thickness in the range of 18 nm to 25 nm. For example, the second film 90 can have a geometric thickness in the range of 19 nm to 24 nm.

The protective layer 92 can be the terminal layer of the solar control coating 30. The protective layer 92 can comprise one or more nonmetallic materials, such as those described above with regard to the phase adjustment layers. Alternatively, the protective layer 92 can comprise a metal material. The protective layer 92 can provide chemical and/or mechanical protection to the underlying coating layers. The protective layer 92 can provide phase adjustment and/or absorption. The protective layer 92 can be a single film or have a multi-film structure.

The protective layer 92 can include one or more metal oxides, silicon oxides, aluminum oxides, aluminosilicates, silicon nitrides, silicon carbides, and silicon oxycarbides. Examples of materials suitable for the protective layer 92 include oxides of one or more of zirconium, zinc, tin, aluminum, silicon, titanium, and mixtures and/or alloys thereof. For example, the protective layer 92 can comprise a metaloxide. For example, the protective layer can comprise titanium dioxide (i.e., titania).

An exemplary metal oxide protective layer 92 can have an optical thickness in the range of 12.5 nm to 20 nm. For example, the metal oxide protective layer 92 can have an optical thickness in the range of 13 nm to 18 nm. For example, the metal oxide protective layer 92 can have an optical thickness in the range of 14 nm to 16.5 nm.

An exemplary metal oxide protective layer 92 can have a geometric thickness in the range of 5 nm to 8 nm. For example, the metal oxide protective layer 92 can have a geometric thickness in the range of 5.5 nm to 7 nm. For example, the metal oxide protective layer 92 can have a geometric thickness in the range of 5.7 nm to 6.5 nm.

Alternatively, the protective layer 92 can comprise a mixture of metal oxides, for example, a mixture of silica and alumina.

The protective layer 92 can comprise a mixed metal oxide comprising 1 wt % to 99 wt % silica and 99 wt % to 1 wt % alumina, such as at least 40 wt % silica and 60 wt % or less alumina, such as at least 70 wt % silica and 30 wt % or less alumina, such as at least 75 wt % silica, such as at least 80 wt % silica, such as at least 85 wt % silica. For example, the protective layer 92 can comprise 85 wt % silica and 15 wt % alumina.

An exemplary mixed metal oxide protective layer 92 can have an optical thickness in the range of 100 nm to 180 nm, preferably, in the range of 120 nm to 160 nm, more preferably in the range of 130 nm to 150 nm.

An exemplary mixed metal oxide protective layer 92 can have a geometric thickness in the range of 50 nm to 90 nm, preferably in the range of 60 nm to 80 nm, more preferably in the range of 65 nm to 75 nm.

In an exemplary coating 30, the first phase adjustment layer 40 comprises a first layer 42 comprising zinc stannate and a second layer 44 comprising zinc oxide, doped zinc oxide, or tin doped zinc oxide. The first metallic layer 46 comprises a continuous layer of metallic silver. The first primer layer 48 comprises titania (deposited as titanium metal). The second phase adjustment layer 50 comprises a first layer 52 comprising zinc oxide, doped zinc oxide, or tin doped zinc oxide, a second layer 54 comprising zinc stannate, and a third layer 56 comprising zinc oxide, doped zinc oxide, or tin doped zinc oxide. The second metallic layer 58 comprises a continuous layer of metallic silver. The second primer layer 60 comprises titania (deposited as titanium metal). The third phase adjustment layer 62 comprises a first layer 64 comprising zinc oxide, doped zinc oxide, or tin doped zinc oxide, a second layer 66 comprising zinc stannate, and a third layer 68 comprising zinc oxide, doped zinc oxide, or tin doped zinc oxide. The third metallic layer 70 comprises a continuous layer of metallic silver. The third primer layer 72 comprises titania (deposited as titanium metal). The fourth phase adjustment layer 86 comprises a first layer 88 comprising zinc oxide, doped zinc oxide, or tin doped zinc oxide; and a second layer 90 comprising zinc stannate. The protective layer 92 comprises a mixture of silica and alumina. Alternatively, the protective layer 92 can comprise titania.

The layers and/or films of the solar control coating 30 can be formed by any conventional method. Examples of such methods include conventional chemical vapor deposition (CVD) and/or physical vapor deposition (PVD) methods. Examples of CVD processes include spray pyrolysis. Examples of PVD processes include electron beam evaporation and vacuum sputtering, such as magnetron sputter vapor deposition (MSVD). Other coating methods could also be used, such as, but not limited to, sol-gel deposition. One or more layers or films can be formed by one method and one or more other layers or films can be formed by a different method. For example, the coating 30 can be formed by MSVD.

Figure 3:
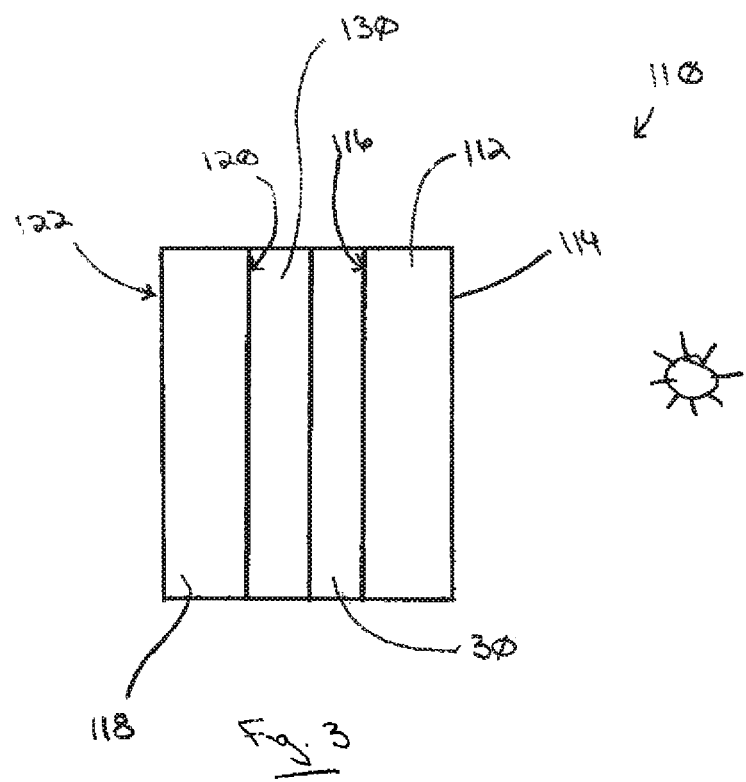
FIG. 3 is a side view (not to scale) of the solar control coating of FIG. 1 or 2 incorporated into a laminated glazing.

FIG. 3 shows the coating 30 of FIGS. 1 and 2 incorporated into a laminated glazing 110. The laminated glazing 110 includes a first ply 112 connected to a second ply 118. The first ply 112 has a first major surface 114 and a second major surface 116. The first major surface 114 (No. 1 surface) faces the building exterior, i.e., is an outer major surface, and the second major surface 116 (No. 2 surface) faces the interior of the building. The second ply 118 has an outwardly facing major surface 120 (No. 3 surface) and an inwardly facing major surface 122 (No. 4 surface). This numbering of the ply surfaces is in keeping with conventional practice in the fenestration art.

In the illustrated example, the solar control coating 30 is located on the No. 2 surface 116. However, the solar control coating 30 could be located on any of the other surfaces. For example, the solar control coating 30 could be located on the No. 3 surface 120. For example, the solar control coating 30 could be located on the No. 1 surface 114 or the No. 4 surface 122.

The first ply 112 is connected to the second ply 118 by an interlayer 130. The interlayer 130 can be of any conventional interlayer material. For example, the interlayer can be polyvinyl butyral (PVB).

The first ply 112 and the second ply 118 can be of any of the materials described above for the substrate 11. The second ply 118 can be the same as the first ply 112 or the second ply 118 can be different than the first ply 112. The first and second plies 112, 118 can each be, for example, clear float glass or can be tinted or colored glass, or one ply 112, 118 can be clear glass and the other ply 112, 118 tinted or colored glass.

The first ply 112 and the second ply 118 can be of any desired dimensions.

The first ply 112 and the second ply 118 can have different levels of visible light transmittance. For example, the first ply 112 can have a higher visible light transmittance than the second ply 118. For example, the first ply 112 can be clear glass and the second ply 118 can be tinted glass.

The solar control coating 30 can provide a reference laminated unit SHGC of not greater than 0.3, for example, not greater than 0.29, not greater than 0.28, not greater than 0.27, not greater than 0.26, or not greater than 0.25.

The solar control coating 30 provides a reference laminated unit visible light transmittance (LTA) in the range of 60% to 80%, for example, 65% to 75% or 71% to 73%.

The solar control coating 30 provides a sheet resistance of less than 5 ohms per square ($\Omega/\square$), for example less than 2$\Omega/\square$, less than 1$\Omega/\square$, less than 0.9$\Omega/\square$, in the range of greater than 0 to 1.5$\Omega/\square$, or in the range of greater than 0 to 1$\Omega/\square$.

The solar control coating 30 provides a reference laminated unit transmitted L* in the range of 75 to 95, in the range of 82 to 92, or in the range of 87 to 89.

The solar control coating 30 provides a reference laminated unit transmitted a* in the range of −6 to 1, in the range of −5 to −1, or in the range of −3 to −2.

The solar control coating 30 provides a reference laminated unit transmitted b* in the range of 2 to 6, in the range of 2.5 to 5, or in the range of 3.8 to 4.4.

The solar control coating 30 provides a reference laminated unit reflected (exterior) L* in the range of 30 to 50, in the range of 35 to 45, or in the range of 39 to 42.

The solar control coating 30 provides a reference laminated unit reflected (exterior) a* in the range of −9 to 1, in the range of −8 to 0, or in the range of −7.4 to −2.

The solar control coating 30 provides a reference laminated unit reflected (exterior) b* in the range of −7 to 3, in the range of −6 to 1.5, or in the range of −5 to 0.

The solar control coating 30 provides a reference laminated unit reflected (interior) L* in the range of 30 to 50, in the range of 35 to 45, or in the range of 40 to 42.

The solar control coating 30 provides a reference laminated unit reflected (interior) a* in the range of −9 to 0, in the range of −8 to −1, or in the range of −7.2 to −3.

The solar control coating 30 provides a reference laminated unit reflected (interior) b* in the range of −6.5 to 1, in the range of −5.5 to 0, or in the range of −4.3 to −1.

The invention is described further in the following numbered clauses.

Clause 1. A solar control coating 30 comprising a first phase adjustment layer 40; a first metallic layer 46 located over the first phase adjustment layer 40; a first primer layer 48 located over the first metallic layer 46; a second phase adjustment layer 50 located over the first primer layer 48; a second metallic layer 58 located over the second phase adjustment layer 50; a second primer layer 60 located over the second metallic layer 58; a third phase adjustment layer 62 located over the second primer layer 60; a third metallic layer 70 located over the third phase adjustment layer 62; a third primer layer 72 located over the third metallic layer 70; a fourth phase adjustment layer 86 located over the third primer layer 72; and a protective layer 92 located over the fourth phase adjustment layer 86.

Clause 2. The solar control coating 30 of clause 1, wherein the phase adjustment layers 40, 50, 62, 86 comprise nonmetallic materials.

Clause 3. The solar control coating 30 of clauses 1 or 2, wherein the phase adjustment layers 40, 50, 62, 86 comprise dielectric or semiconductor materials.

Clause 4. The solar control coating 30 of any of clauses 1 to 3, wherein the first phase adjustment layer 40 comprises a metal oxide, a doped metal oxide, a mixture of metal oxides, or a metal alloy oxide.

Clause 5. The solar control coating 30 of any of clauses 1 to 4, wherein the first phase adjustment layer 40 comprises doped or non-doped oxides of zinc and tin.

Clause 6. The solar control coating 30 of any of clauses 1 to 5, wherein the first phase adjustment layer 40 has an optical thickness in the range of 44 nm to 90 nm, preferably an optical thickness in the range of 51 nm to 81 nm, more preferably an optical thickness in the range of 53 nm to 74 nm.

Clause 7. The solar control coating 30 of any of clauses 1 to 5, wherein the first phase adjustment layer 40 has a geometric thickness in the range of 22 nm to 45 nm, preferably a geometric thickness in the range of 25 nm to 41 nm, more preferably a geometric thickness in the range of 26 nm to 37 nm.

Clause 8. The solar control coating 30 of any of clauses 1 to 7, wherein the first phase adjustment layer 40 comprises a multi-film structure having a first film 42 and a second film 44 located over the first film 42.

Clause 9. The solar control coating 30 of clause 8, wherein the first film 42 comprises an oxide of an alloy of zinc and tin.

Clause 10. The solar control coating 30 of clauses 8 or 9, wherein the first film 42 comprises zinc stannate.

Clause 11. The solar control coating 30 of any of clauses 8 to 10, wherein the second film 44 comprises tin doped zinc oxide.

Clause 12. The solar control coating 30 of any of clauses 8 to 11, wherein the first film 42 has an optical thickness in the range of 30 nm to 60 nm, preferably an optical thickness in the range of 36 nm to 54 nm, more preferably an optical thickness in the range of 37 nm to 50 nm.

Clause 13. The solar control coating 30 of any of clauses 8 to 12, wherein the first film 42 has a geometric thickness in the range of 15 nm to 30 nm, preferably a geometric thickness in the range of 18 nm to 27 nm, more preferably a geometric thickness in the range of 18 nm to 25 nm.

Clause 14. The solar control coating 30 of any of clauses 8 to 13, wherein the second film 44 has an optical thickness in the range of 14 nm to 30 nm, preferably an optical thickness in the range of 14 nm to 28 nm, more preferably an optical thickness in the range of 16 nm to 25 nm.

Clause 15. The solar control coating 30 of any of clauses 8 to 14, wherein the second film 44 has a geometric thickness in the range of 7 nm to 15 nm, preferably a geometric thickness in the range of 7 nm to 14 nm, more preferably a geometric thickness in the range of 8 nm to 13 nm.

Clause 16. The solar control coating 30 of any of clauses 1 to 15, wherein the first metallic layer 46 comprises a continuous film of metallic silver.

Clause 17. The solar control coating 30 of any of clauses 1 to 16, wherein the first metallic layer 46 has a geometric thickness in the range of 8 nm to 15 nm, preferably a geometric thickness in the range of 8 nm to 13 nm, more preferably a geometric thickness in the range of 9 nm to 11 nm.

Clause 18. The solar control coating 30 of any of clauses 1 to 17, wherein the first primer layer 48 comprises titania.

Clause 19. The solar control coating 30 of any of clauses 1 to 18, wherein the first primer layer 48 has an optical thickness in the range of 6 nm to 14 nm, preferably in the range of 7 nm to 12 nm, more preferably in the range of 8 nm to 10 nm.

Clause 20. The solar control coating 30 of any of clauses 1 to 19, wherein the first primer layer 48 has a geometric thickness in the range of 2.5 nm to 5.5 nm, preferably in the range of 3 nm to 4.5 nm, more preferably in the range of 3.5 nm to 4 nm.

Clause 21. The solar control coating 30 of any of clauses 1 to 20, wherein the second phase adjustment layer 50 has an optical thickness in the range of 97 nm to 176 nm, preferably an optical thickness in the range of 99 nm to 156 nm, more preferably an optical thickness in the range of 118 nm to 136 nm.

Clause 22. The solar control coating 30 of any of clauses 1 to 21, wherein the second phase adjustment layer 50 has a geometric thickness in the range of 33 nm to 88 nm, preferably a geometric thickness in the range of 33.5 nm to 78 nm, more preferably a geometric thickness in the range of 59 nm to 68 nm.

Clause 23. The solar control coating 30 of any of clauses 1 to 22, wherein the second phase adjustment layer 50 includes a first film 52, a second film 54, and a third film 56.

Clause 24. The solar control coating 30 of clause 23, wherein the first film 52 and the third film 56 comprise zinc oxide or tin doped zinc oxide.

Clause 25. The solar control coating 30 of clauses 23 or 24, wherein the second film 54 comprises zinc stannate.

Clause 26. The solar control coating 30 of any of clauses 23 to 25, wherein the first film 52 and/or the third film 56 have an optical thickness in the range of 17 nm to 33 nm, preferably an optical thickness in the range of 17 nm to 30 nm, more preferably an optical thickness in the range of 20 nm to 25 nm.

Clause 27. The solar control coating 30 of any of clauses 23 to 26, wherein the first film 52 and/or third film 56 have a geometric thickness in the range of 7 nm to 13 nm, preferably a geometric thickness in the range of 7 nm to 12 nm, more preferably a geometric thickness in the range of 8 nm to 10 nm.

Clause 28. The solar control coating 30 of any of clauses 23 to 27, wherein the second film 54 has an optical thickness in the range of 70 nm to 130 nm, preferably an optical thickness in the range of 80 nm to 112 nm, more preferably an optical thickness in the range of 84 nm to 98 nm.

Clause 29. The solar control coating 30 of any of clauses 23 to 28, wherein the second film 54 has a geometric thickness in the range of 35 nm to 65 nm, preferably a geometric thickness in the range of 40 nm to 56 nm, more preferably a geometric thickness in the range of 42 nm to 49 nm.

Clause 30. The solar control coating 30 of any of clauses 1 to 29, wherein the second metallic layer 58 comprises a continuous silver film.

Clause 31. The solar control coating 30 of any of clauses 1 to 30, wherein the second metallic layer 58 has a geometric thickness in the range of 8.5 nm to 15 nm, preferably a geometric thickness in the range of 10 nm to 13.5 nm, more preferably a geometric thickness in the range of 10 nm to 13 nm.

Clause 32. The solar control coating 30 of any of clauses 1 to 31, wherein the second primer layer 60 comprises titania.

Clause 33. The solar control coating 30 of any of clauses 1 to 32, wherein the second primer layer 60 has an optical thickness in the range of 6 nm to 13 nm, preferably an optical thickness the range of 7 nm to 12 nm, more preferably an optical thickness in the range of 8 nm to 10 nm.

Clause 34. The solar control coating 30 of any of clauses 1 to 33, wherein the second primer layer 60 has a geometric thickness in the range of 2.5 nm to 5 nm, preferably a geometric thickness in the range of 3 nm to 4.5 nm, more preferably a geometric thickness in the range of 3.5 nm to 4 nm.

Clause 35. The solar control coating 30 of any of clauses 1 to 34, wherein the third phase adjustment layer 62 has an optical thickness in the range of 112 nm to 169 nm, preferably an optical thickness in the range of 126 nm to 160 nm, more preferably an optical thickness in the range of 147 nm to 156 nm.

Clause 36. The solar control coating 30 of any of clauses 1 to 35, wherein the third phase adjustment layer 62 has a geometric thickness in the range of 56 nm to 85 nm, preferably a geometric thickness in the range of 63 nm to 80 nm, more preferably a geometric thickness in the range of 73.5 nm to 78 nm.

Clause 37. The solar control coating 30 of any of clauses 1 to 36, wherein the third phase adjustment layer 62 includes a first film 64, a second film 66, and a third film 68.

Clause 38. The solar control coating 30 of clause 37, wherein the first film 64 and/or the third film 68 comprises zinc oxide or tin doped zinc oxide.

Clause 39. The solar control coating 30 of clauses 37 or 38, wherein the second film 66 comprises zinc stannate.

Clause 40. The solar control coating 30 of any of clauses 37 to 39, wherein the first film 64 and/or the third film 68 have an optical thickness in the range of 17 nm to 40 nm, preferably an optical thickness in the range of 20 nm to 35 nm, more preferably an optical thickness in the range of 25 nm to 35 nm.

Clause 41. The solar control coating 30 of any of clauses 37 to 40, wherein the first film 64 and/or the third film 68 have a geometric thickness in the range of 7 nm to 16 nm, preferably a geometric thickness in the range of 8 nm to 14 nm, more preferably a geometric thickness in the range of 10 nm to 14 nm.

Clause 42. The solar control coating 30 of any of clauses 37 to 41, wherein the second film 66 has an optical thickness in the range of 80 nm to 120 nm, preferably an optical thickness in the range of 88 nm to 110 nm, more preferably an optical thickness in the range of 104 nm to 108 nm.

Clause 43. The solar control coating 30 of any of clauses 37 to 42, wherein the second film 66 has a geometric thickness in the range of 40 nm to 60 nm, preferably a geometric thickness in the range of 44 nm to 55 nm, more preferably a geometric thickness in the range of 52 nm to 54 nm.

Clause 44. The solar control coating 30 of any of clauses 1 to 43, wherein the third metallic layer 70 comprises a metallic silver film.

Clause 45. The solar control coating 30 of any of clauses 1 to 44, wherein the third metallic layer 70 has a geometric thickness in the range of 8.5 nm to 16 nm, preferably a geometric thickness in the range of 10 nm to 15 nm, more preferably a geometric thickness in the range of 12 nm to 14 nm.

Clause 46. The solar control coating 30 of any of clauses 1 to 45, wherein the third primer layer 72 comprises titania.

Clause 47. The solar control coating 30 of any of clauses 1 to 46, wherein the third primer layer 72 has an optical thickness in the range of 2.5 nm to 10 nm, preferably an optical thickness in the range of 3.5 nm to 8 nm, more preferably an optical thickness in the range of 5 nm to 6.5 nm.

Clause 48. The solar control coating 30 of any of clauses 1 to 47, wherein the third primer layer 72 has a geometric thickness in the range of 1 nm to 4 nm, preferably a geometric thickness in the range of 1.5 nm to 3 nm, more preferably in the range of 2 nm to 2.5 nm.

Clause 49. The solar control coating 30 of any of clauses 1 to 48, wherein the fourth phase adjustment layer 86 has an optical thickness in the range of 47 nm to 82 nm, preferably an optical thickness in the range of 58 nm to 75 nm, more preferably an optical thickness in the range of 60 nm to 73 nm.

Clause 50. The solar control coating 30 of any of clauses 1 to 49, wherein the fourth phase adjustment layer 86 has a geometric thickness in the range of 23 nm to 41 nm, preferably a geometric thickness in the range of 29 nm to 38 nm, more preferably a geometric thickness in the range of 30 nm to 37 nm.

Clause 51. The solar control coating 30 of any of clauses 1 to 50, wherein the fourth phase adjustment layer 86 comprises a first film 88 and a second film 90.

Clause 52. The solar control coating 30 of clause 51, wherein the first film 88 comprises zinc oxide or tin doped zinc oxide.

Clause 53. The solar control coating 30 of clauses 51 or 52, wherein the second film 90 comprises zinc stannate.

Clause 54. The solar control coating 30 of any of clauses 51 to 53, wherein the first film 88 has an optical thickness in the range of 17 nm to 30 nm, preferably an optical thickness in the range of 20 nm to 27 nm, more preferably an optical thickness in the range of 20 nm to 26 nm.

Clause 55. The solar control coating 30 of any of clauses 51 to 54, wherein the first film 88 has a geometric thickness in the range of 8 nm to 15 nm, preferably a geometric thickness in the range of 10 nm to 14 nm, more preferably a geometric thickness in the range of 10 nm to 13 nm.

Clause 56. The solar control coating 30 of any of clauses 51 to 55, wherein the second film 90 has an optical thickness in the range of 30 nm to 52 nm, preferably an optical thickness in the range of 36 nm to 50 nm, more preferably an optical thickness in the range of 38 nm to 48 nm.

Clause 57. The solar control coating 30 of any of clauses 51 to 56, wherein the second film 90 has a geometric thickness in the range of 15 nm to 26 nm, preferably a geometric thickness in the range of 18 nm to 25 nm, more preferably a geometric thickness in the range of 19 nm to 24 nm.

Clause 58. The solar control coating 30 of any of clauses 1 to 57, wherein the protective layer 92 comprises a mixture of silica and alumina.

Clause 59. The solar control coating 30 of any of clauses 1 to 58, wherein the protective layer 92 has an optical thickness in the range of 100 nm to 180 nm, preferably an optical thickness in the range of 120 nm to 160 nm, more preferably an optical thickness in the range of 130 nm to 150 nm.

Clause 60. The solar control coating 30 of any of clauses 1 to 59, wherein the protective layer 92 has a geometric thickness in the range of 50 nm to 90 nm, preferably a geometric thickness in the range of 60 nm to 80 nm, more preferably a geometric thickness in the range of 65 nm to 75 nm.

Clause 61. The solar control coating 30 of any of clauses 1 to 60, wherein the first phase adjustment layer 40 comprises a first layer 42 comprising zinc stannate and a second layer 44 comprising ZnO 90/10; the first metallic layer 46 comprises a continuous layer of metallic silver; the first primer layer 48 comprises titania deposited as titanium metal; the second phase adjustment layer 50 comprises a first layer 52 comprising ZnO 90/10, a second layer 54 comprising zinc stannate, and a third layer 56 comprising ZnO 90/10; the second metallic layer 58 comprises a continuous layer of metallic silver; the second primer layer 60 comprises titania deposited as titanium metal; the third phase adjustment layer 62 comprises a first layer 64 comprising ZnO 90/10, a second layer 66 comprising zinc stannate, and a third layer 68 comprising ZnO 90/10; the third metallic layer 70 comprises a continuous layer of metallic silver; the third primer layer 72 comprises titania deposited as titanium metal; the fourth phase adjustment layer 86 comprises a first layer 88 comprising ZnO 90/10 and a second layer 90 comprising zinc stannate; and the protective layer 92 comprises a mixture of silica and alumina.

Clause 62. A laminated glazing 110 comprising a first ply 112 connected to a second ply 118 by a polymeric interlayer 130, wherein the first ply 112 has a first major surface 114 and a second major surface 116, and the second ply 118 has a third major surface 120 and a fourth major surface 122; and a solar control coating 30 of any of claims 1 to 61 located on at least one of the major surfaces.

Clause 63. The laminated glazing 110 of clause 62, wherein the solar control coating 30 is located on the second major surface 116.

Clause 64. The laminated glazing 110 of clauses 62 or 63, wherein the first ply 112 and the second ply 118 can have different levels of visible light transmittance.

Clause 65. The laminated glazing 110 of any of clauses 62 to 64, wherein the first ply 112 has a higher visible light transmittance than the second ply 118.

Clause 66. The laminated glazing 110 of any of clauses 62 to 65, wherein the first ply 112 comprises clear glass and the second ply 118 comprises tinted glass.

Clause 67. A laminated glazing 110 comprising a first ply 112 connected to a second ply 118 by a polymeric interlayer 130, wherein the first ply 112 has a first major surface 114 and a second major surface 116, and the second ply 118 has a third major surface 120 and a fourth major surface 122; and a solar control coating 30 located on at least one of the major surfaces, the solar control coating 30 comprising: a first phase adjustment layer 40; a first metallic layer 46 located over the first phase adjustment layer 40; a first primer layer 48 located over the first metallic layer 46; a second phase adjustment layer 50 located over the first primer layer 48; a second metallic layer 58 located over the second phase adjustment layer 50; a second primer layer 60 located over the second metallic layer 58; a third phase adjustment layer 62 located over the second primer layer 60; a third metallic layer 70 located over the third phase adjustment layer 62; a third primer layer 72 located over the third metallic layer 70; a fourth phase adjustment layer 86 located over the third primer layer 72; and a protective layer 92 located over the fourth phase adjustment layer 86, wherein the first phase adjustment layer 40 has an optical thickness in the range of 44 nm to 90 nm, preferably an optical thickness in the range of 51 nm to 81 nm, more preferably an optical thickness in the range of 53 nm to 74 nm; wherein the second phase adjustment layer 50 has an optical thickness in the range of 97 nm to 176 nm, preferably an optical thickness in the range of 99 nm to 156 nm, more preferably an optical thickness in the range of 118 nm to 136 nm; wherein the third phase adjustment layer 62 has an optical thickness in the range of 112 nm to 169 nm, preferably an optical thickness in the range of 126 nm to 160 nm, more preferably an optical thickness in the range of 147 nm to 156 nm; and/or wherein the fourth phase adjustment layer 86 has an optical thickness in the range of 47 nm to 82 nm, preferably an optical thickness in the range of 58 nm to 75 nm, more preferably an optical thickness in the range of 60 nm to 73 nm.

Clause 68. The laminated glazing 110 of clause 67: wherein the phase adjustment layers 40, 50, 62, 86 comprise dielectric or semiconductor materials.

Clause 69. The laminated glazing 110 any one of clauses 67-68: wherein the phase adjustment layers 40, 50, 62, 86 comprise non-metallic materials.

Clause 70. The laminated glazing 110 of any one of clauses 67-69: wherein the first phase adjustment layer 40 has a geometric thickness in the range of 22 nm to 45 nm, preferably a geometric thickness in the range of 25 nm to 41 nm, more preferably a geometric thickness in the range of 26 nm to 37 nm; wherein the second phase adjustment layer 50 has a geometric thickness in the range of 33 nm to 88 nm, preferably a geometric thickness in the range of 33.5 nm to 78 nm, more preferably a geometric thickness in the range of 59 nm to 68 nm; wherein the third phase adjustment layer 62 has a geometric thickness in the range of 56 nm to 85 nm, preferably a geometric thickness in the range of 63 nm to 80 nm, more preferably a geometric thickness in the range of 73.5 nm to 78 nm; and/or wherein the fourth phase adjustment layer 86 has a geometric thickness in the range of 23 nm to 41 nm, preferably a geometric thickness in the range of 29 nm to 38 nm, more preferably a geometric thickness in the range of 30 nm to 37 nm.

Clause 71. The laminated glazing 110 of any one of clauses 67-70: wherein the first primer layer 48 has an optical thickness in the range of 6 nm to 14 nm, preferably in the range of 7 nm to 12 nm, more preferably in the range of 8 nm to 10 nm; wherein the second primer layer 60 has an optical thickness in the range of 6 nm to 13 nm, preferably an optical thickness the range of 7 nm to 12 nm, more preferably an optical thickness in the range of 8 nm to 10 nm; and/or wherein the third primer layer 72 has an optical thickness in the range of 2.5 nm to 10 nm, preferably an optical thickness in the range of 3.5 nm to 8 nm, more preferably an optical thickness in the range of 5 nm to 6.5 nm.

Clause 72. The laminated glazing 110 of any one of clauses 67-71: wherein the first primer layer 48 has a geometric thickness in the range of 2.5 nm to 5.5 nm, preferably in the range of 3 nm to 4.5 nm, more preferably in the range of 3.5 nm to 4 nm; wherein the second primer layer 60 has a geometric thickness in the range of 2.5 nm to 5 nm, preferably a geometric thickness in the range of 3 nm to 4.5 nm, more preferably a geometric thickness in the range of 3.5 nm to 4 nm; and/or wherein the third primer layer 72 has a geometric thickness in the range of 1 nm to 4 nm, preferably a geometric thickness in the range of 1.5 nm to 3 nm, more preferably a geometric thickness in the range of 2 nm to 2.5 nm.

Clause 73. The laminated glazing 110 of any one of clauses 67-72: wherein the first metallic layer 46 has a geometric thickness in the range of 8 nm to 15 nm, preferably a geometric thickness in the range of 8 nm to 13 nm, more preferably a geometric thickness in the range of 9 nm to 11 nm; wherein the second metallic layer 58 has a geometric thickness in the range of 8.5 nm to 15 nm, preferably a geometric thickness in the range of 10 nm to 13.5 nm, more preferably a geometric thickness in the range of 10 nm to 13 nm, and/or wherein the third metallic layer 70 has a geometric thickness in the range of 8.5 nm to 16 nm, preferably a geometric thickness in the range of 10 nm to 15 nm, more preferably a geometric thickness in the range of 12 nm to 14 nm.

Clause 74. The laminated glazing 110 of any one of clauses 67-73: wherein the protective layer 92 has an optical thickness in the range of 60 nm to 200 nm, preferably an optical thickness in the range of 100 nm to 180 nm, more preferably an optical thickness in the range of 120 nm to 160 nm, more preferably an optical thickness in the range of 130 nm to 150 nm.

Clause 75. The laminated glazing 110 of any one of clauses 67-74: wherein at least one of the phase adjustment layers 40, 50, 62 comprises a metal oxide, a doped metal oxide, a non-doped metal oxide, a mixture of metal oxides, or a metal alloy oxide; wherein at least one of the metallic layers 46, 58, 70 comprises a continuous film of metallic silver; and/or wherein at least one of the primer layers 48, 60, 72 comprises titania.

Clause 76. The laminated glazing 110 of any one of clauses 67-75: wherein the first phase adjustment layer 40 comprises a multi-film structure having a first film 42 and a second film 44 located over the first film 42; wherein the first film 42 has a geometric thickness in the range of 15 nm to 30 nm, preferably a geometric thickness in the range of 18 nm to 27 nm, more preferably a geometric thickness in the range of 18 nm to 25 nm; wherein the second film 44 has a geometric thickness in the range of 7 nm to 15 nm, preferably a geometric thickness in the range of 7 nm to 14 nm, more preferably a geometric thickness in the range of 8 nm to 13 nm; wherein the first film 42 comprises an oxide of an alloy of zinc and tin; and/or wherein the second film 44 comprises tin doped zinc oxide.

Clause 77. The laminated glazing 110 of any one of clauses 67-76: wherein the second phase adjustment layer 50 includes a first film 52, a second film 54, and a third film 56; wherein the first film 52 and/or third film 56 have a geometric thickness in the range of 7 nm to 13 nm, preferably a geometric thickness in the range of 7 nm to 12 nm, more preferably a geometric thickness in the range of 8 nm to 10 nm; wherein the second film 54 has a geometric thickness in the range of 35 nm to 65 nm, preferably a geometric thickness in the range of 40 nm to 56 nm, more preferably a geometric thickness in the range of 42 nm to 49 nm; wherein the first film 52 and the third film 56 comprise zinc oxide or tin doped zinc oxide; and/or wherein the second film 54 comprises zinc stannate.

Clause 78. The laminated glazing 110 of any one of clauses 67-77: wherein the third phase adjustment layer 62 includes a first film 64, a second film 66, and a third film 68 wherein the first film 64 and/or the third film 68 have a geometric thickness in the range of 7 nm to 16 nm, preferably a geometric thickness in the range of 8 nm to 14 nm, more preferably a geometric thickness in the range of 10 nm to 14 nm; wherein the second film 66 has a geometric thickness in the range of 40 nm to 60 nm, preferably a geometric thickness in the range of 44 nm to 55 nm, more preferably a geometric thickness in the range of 52 nm to 54 nm; wherein the first film 64 and/or the third film 68 comprises zinc oxide or tin doped zinc oxide; and/or wherein the second film 66 comprises zinc stannate.

Clause 79. The laminated glazing 110 of any one of clauses 67-78: wherein the protective layer 92 has a geometric thickness in the range of 30 nm to 100 nm, preferably a geometric thickness in the range of 50 nm to 90 nm, more preferably a geometric thickness in the range of 60 nm to 80 nm, more preferably a geometric thickness in the range of 65 nm to 75 nm; and/or wherein the protective layer 92 comprises a mixture of silica and alumina.

Clause 80. The laminated glazing 110 of any one of clauses 67-79: wherein the first phase adjustment layer 40 comprises a first film 42 comprising zinc stannate and a second film 44 comprising ZnO 90/10; the first metallic layer 46 comprises a continuous layer of metallic silver; the first primer layer 48 comprises titania deposited as titanium metal; the second phase adjustment layer 50 comprises a first film 52 comprising ZnO 90/10, a second film 54 comprising zinc stannate, and a third film 56 comprising ZnO 90/10; the second metallic layer 58 comprises a continuous layer of metallic silver; the second primer layer 60 comprises titania deposited as titanium metal; the third phase adjustment layer 62 comprises a first film 64 comprising ZnO 90/10, a second film 66 comprising zinc stannate, and a third film 68 comprising ZnO 90/10; the third metallic layer 70 comprises a continuous layer of metallic silver; the third primer layer 72 comprises titania deposited as titanium metal; the fourth phase adjustment layer 86 comprises a first layer 88 comprising ZnO 90/10 and a second layer 90 comprising zinc stannate; and the protective layer 92 comprises a mixture of silica and alumina.

Clause 81. The laminated glazing 110 of any one of clauses 67-80: wherein the solar control coating 30 is located on the second major surface 116, and/or wherein the first ply 112 has a higher visible light transmittance than the second ply 118.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A laminated glazing comprising a first ply connected to a second ply by a polymeric interlayer, wherein the first ply has a first major surface and a second major surface, and the second ply has a third major surface and a fourth major surface; and a solar control coating located on at least one of the major surfaces, the solar control coating comprising:
a first phase adjustment layer; a first metallic layer located over the first phase adjustment layer; a first primer layer located over the first metallic layer; a second phase adjustment layer located over the first primer layer; a second metallic layer located over the second phase adjustment layer; a second primer layer located over the second metallic layer; a third phase adjustment layer located over the second primer layer; a third metallic layer located over the third phase adjustment layer; a third primer layer located over the third metallic layer; a fourth phase adjustment layer located over the third primer layer; and a protective layer located over the fourth phase adjustment layer,
wherein the first phase adjustment layer has an optical thickness in the range of 53 nm to 74 nm;
wherein the second phase adjustment layer has an optical thickness in the range of 118 nm to 136 nm;
wherein the third phase adjustment layer has an optical thickness in the range of 147 nm to 156 nm; and/or
wherein the fourth phase adjustment layer has an optical thickness in the range of 60 nm to 73 nm.

2. The laminated glazing of claim 1 wherein the phase adjustment layers comprise dielectric or semiconductor materials.

3. The laminated glazing of claim 1 wherein the phase adjustment layers comprise non-metallic materials.

4. The laminated glazing of claim 1:
wherein the first phase adjustment layer has a geometric thickness in the range of 26 nm to 37 nm;
wherein the second phase adjustment layer has a geometric thickness in the range of 59 nm to 68 nm;
wherein the third phase adjustment layer has a geometric thickness in the range of 73.5 nm to 78 nm; and/or
wherein the fourth phase adjustment layer has a geometric thickness in the range of 30 nm to 37 nm.

5. The laminated glazing of claim 1:
wherein the first primer layer has an optical thickness in the range of 6 nm to 14 nm;
wherein the second primer layer has an optical thickness in the range of 6 nm to 13 nm; and/or
wherein the third primer layer has an optical thickness in the range of 2.5 nm to 10 nm.

6. The laminated glazing of claim 1:
wherein the first primer layer has a geometric thickness in the range of 2.5 nm to 5.5 nm;
wherein the second primer layer has a geometric thickness in the range of 2.5 nm to 5 nm; and/or
wherein the third primer layer has a geometric thickness in the range of 1 nm to 4 nm.

7. The laminated glazing of claim 1:
wherein the first metallic layer has a geometric thickness in the range of 8 nm to 15 nm;
wherein the second metallic layer has a geometric thickness in the range of 8.5 nm to 15 nm; and
wherein the third metallic layer has a geometric thickness in the range of 8.5 nm to 16 nm.

8. The laminated glazing of claim 1:
wherein the protective layer has an optical thickness in the range of 60 nm to 200 nm.

9. The laminated glazing of claim 1:
wherein at least one of the phase adjustment layers comprises a metal oxide, a doped metal oxide, a non-doped metal oxide, a mixture of metal oxides, or a metal alloy oxide;
wherein at least one of the metallic layers comprises a continuous film of metallic silver; and/or
wherein at least one of the primer layers comprises titania.

10. The laminated glazing of claim 1:
wherein the first phase adjustment layer comprises a multi-film structure having a first film and a second film located over the first film;
wherein the first film has a geometric thickness in the range of 18 nm to 25 nm;
wherein the second film has a geometric thickness in the range of 8 nm to 13 nm;
wherein the first film comprises an oxide of an alloy of zinc and tin;
wherein the second film comprises zinc oxide or tin doped zinc oxide.

11. The laminated glazing of claim 1:
wherein the second phase adjustment layer comprises a first film, a second film, and a third film;
wherein the first film or third film have a geometric thickness in the range of 8 nm to 10 nm;
wherein the second film has a geometric thickness in the range of 42 nm to 49 nm;
wherein the first film and the third film comprise zinc oxide or tin doped zinc oxide; and/or
wherein the second film comprises zinc stannate.

12. The laminated glazing of claim 1:
wherein the third phase adjustment layer comprises a first film, a second film, and a third film;
wherein the first film and/or the third film have a geometric thickness in the range of 10 nm to 14 nm;
wherein the second film has a geometric thickness in the range of 52 nm to 54 nm;
wherein the first film and/or the third film comprises zinc oxide or tin doped zinc oxide; and/or
wherein the second film comprises zinc stannate.

13. The laminated glazing of claim 1:
wherein the protective layer has a geometric thickness in the range of 30 nm to 100 nm; and/or
wherein the protective layer comprises a mixture of silica and alumina.

14. The laminated glazing of claim 1:
wherein the first phase adjustment layer comprises a first film comprising zinc stannate and a second film comprising zinc oxide; the first metallic layer comprises a continuous layer of metallic silver; the first primer layer comprises titania deposited as titanium metal; the second phase adjustment layer comprises a first film comprising zinc oxide, a second film comprising zinc stannate, and a third film comprising zinc oxide; the second metallic layer comprises a continuous layer of metallic silver; the second primer layer comprises titania deposited as titanium metal; the third phase adjustment layer comprises a first film comprising zinc oxide, a second film comprising zinc stannate, and a third film comprising zinc oxide; the third metallic layer comprises a continuous layer of metallic silver; the third primer layer comprises titania deposited as titanium metal; the fourth phase adjustment layer comprises a first layer comprising zinc oxide and a second layer comprising zinc stannate; and the protective layer comprises a mixture of silica and alumina.

15. The laminated glazing of claim 1, wherein the solar control coating is located on the second major surface, wherein the first ply has a higher visible light transmittance than the second ply.

16. The laminated glazing of claim 1:
wherein the first metallic layer has a geometric thickness in the range of 8 nm to 13 nm;
wherein the second metallic layer has a geometric thickness in the range of 10 nm to 13.5 nm; and
wherein the third metallic layer has a geometric thickness in the range of 10 nm to 15 nm.

17. The laminated glazing of claim 1:
wherein the first metallic layer has a geometric thickness in the range of 9 nm to 11 nm;
wherein the second metallic layer has a geometric thickness in the range of 10 nm to 13 nm; and
wherein the third metallic layer has a geometric thickness in the range of 12 nm to 14 nm.

18. The laminated glazing of claim 1:
wherein the fourth phase adjustment layer comprises a first film and a second film;
wherein the first film has a geometric thickness in the range of 10 nm to 13 nm;
wherein the second film has a geometric thickness in the range of 19 nm to 24 nm;
wherein the first film comprises zinc oxide or tin doped zinc oxide; and/or
wherein the second film comprises zinc stannate.

19. A method of preparing a laminated glazing comprising a first ply connected to a second ply by a polymeric interlayer, wherein the first ply has a first major surface and a second major surface, and the second ply has a third major surface and a fourth major surface; the method comprising:
applying a solar control coating to the second major surface or the third major surface, the solar control coating comprising:
a first phase adjustment layer; a first metallic layer located over the first phase adjustment layer; a first primer layer located over the first metallic layer; a second phase adjustment layer located over the first primer layer; a second metallic layer located over the second phase adjustment layer; a second primer layer located over the second metallic layer; a third phase adjustment layer located over the second primer layer; a third metallic layer located over the third phase adjustment layer; a third primer layer located over the third metallic layer; a fourth phase adjustment layer located over the third primer layer; and a protective layer located over the fourth phase adjustment layer,
wherein the first phase adjustment layer has an optical thickness in the range of 53 nm to 74 nm;
wherein the second phase adjustment layer has an optical thickness in the range of 118 nm to 136 nm;
wherein the third phase adjustment layer has an optical thickness in the range of 147 nm to 156 nm; and/or
wherein the fourth phase adjustment layer has an optical thickness in the range of 60 nm to 73 nm.

* * * * *